United States Patent [19]

O'Connor et al.

[11] Patent Number: 5,370,908
[45] Date of Patent: Dec. 6, 1994

[54] LOW VOC, HEAT-CURABLE, ONE-COMPONENT AND TWO-COMPONENT COATING COMPOSITIONS BASED ON ORGANIC POLYISOCYANATES

[75] Inventors: James M. O'Connor, Branford; Fred A. Stuber, North Haven; Kiran B. Chandalia, Cheshire; Adam G. Malofsky, Huntington, all of Conn.

[73] Assignee: Olin Corporation, Cheshire, Conn.

[21] Appl. No.: 65,009

[22] Filed: May 24, 1993

[51] Int. Cl.$^5$ ............................................. B05D 3/02
[52] U.S. Cl. ......................... 427/385.5; 428/422.8; 428/423.1; 528/45; 528/67; 528/73
[58] Field of Search ................. 427/385.5; 528/45, 67, 528/73; 428/422.8, 423.1

[56] References Cited

U.S. PATENT DOCUMENTS

| | | | |
|---|---|---|---|
| 3,645,979 | 2/1972 | Liebsch et al. | 260/77.5 |
| 3,745,133 | 7/1973 | Communale et al. | 260/2.5 |
| 3,981,829 | 9/1976 | Cenker et al. | 260/2.5 |
| 3,996,223 | 12/1976 | Gupta et al. | 260/248 |
| 4,067,830 | 1/1978 | Kresta | 260/2.5 |
| 4,115,373 | 9/1978 | Henes et al. | 528/48 |
| 4,288,586 | 9/1981 | Bock et al. | 528/44 X |
| 4,292,350 | 9/1981 | Kubitza et al. | 427/385.5 |
| 4,324,879 | 4/1982 | Bock et al. | 528/45 |
| 4,412,073 | 10/1983 | Robin | 544/193 |
| 4,454,317 | 6/1984 | Disteldorf et al. | 544/193 |
| 4,456,658 | 6/1984 | Kubitza et al. | 428/424.6 |
| 4,614,785 | 9/1986 | Richter et al. | 528/45 |
| 4,801,663 | 1/1989 | Ueyanagi et al. | 525/528 |
| 5,124,427 | 6/1992 | Potter et al. | 528/67 |
| 5,144,031 | 9/1992 | Pedain | 252/182.21 |
| 5,232,988 | 8/1993 | Venham et al. | 252/182.21 |
| 5,237,058 | 8/1993 | Laas et al. | 528/73 X |

Primary Examiner—Michael Lusignan
Attorney, Agent, or Firm—Dale Lynn Carlson

[57] ABSTRACT

The present invention relates to a process for coating a substrate which comprises (a) contacting said substrate with a low volatility organic (so-called "low VOC") coating composition having a viscosity as measured by ZAHN cup 2 of less than about 200 seconds and consisting essentially of at least one polyisocyanate, a solvent in an amount of between 0% and 45% by weight based upon the amount of said polyisocyanate in said composition, and an trimerization catalyst, said composition being essentially free of any volatile mono- and di-isocyanates, to form a coating on said substrate, and (b) heating said coating to a curing temperature of between 120° F. and 350° F. for a curing time of between about ten minutes and about six hours in order to cure said coating by trimerizing at least some of the isocyanate groups of the polyisocyanate to provide a heat-cured coating on said substrate. Also claimed is the coating composition itself.

6 Claims, No Drawings

LOW VOC, HEAT-CURABLE, ONE-COMPONENT AND TWO-COMPONENT COATING COMPOSITIONS BASED ON ORGANIC POLYISOCYANATES

FIELD OF THE INVENTION

This invention relates generally to heat-curable coating compositions, and, more specifically to a process for coating substrates with a low volatile organic (so-called "low VOC") coating composition which is suitably rapidly hardened under the influence of heat.

BACKGROUND OF THE INVENTION

The use of moisture-curable one-component and two-component isocyanate-based coating compositions in the production of coatings for substrates is known in the art. As an illustration of a one-component system, U.S. Pat. No. 4,456,658 discloses a process for coating polyvinyl chloride sheet products with a moisture-curable, clear coating comprising a binder which consists essentially of at least one polyisocyanate which is liquid at room temperature. The polyisocyanate binder is further characterized at column 2, lines 12–17 of the '658 patent as being in particular polyisocyanates containing biuret or isocyanurate groups and optionally uretidione groups and having an average isocyanate functionality above 2, preferably from about 2.5 to 6. Unfortunately, the '658 patent is limited to coating polyvinyl chloride sheet products, which represents a narrow market niche as compared to the wide variety of substrates in the marketplace that could benefit from a suitable one-component coating. The coating compositions of the examples of the '658 patent also have the disadvantage of slow drying times when cured with atmospheric moisture at room temperature.

As an additional illustration, U.S. Pat. No. 4,292,350 discloses a process of coating substrates comprising applying to the substrate a moisture-curable, solvent-free or low solvent lacquer composition containing as a binder an isocyanate mixture. The isocyanate mixture described in the '350 patent is a mixture of (a) an organic polyisocyanate having an average isocyanate functionality of greater than 2 which contains biuret, urethane and/or isocyanurate groups and has an isocyanate content of from about 13 to 30% by weight, and (b) at least one monoisocyanate having a defined structure. The monoisocyanate is further described at column 3, lines 18–22 of the '350 patent as being suitably prepared by reacting excess quantities of a diisocyanate with a hydrocarbon-containing hydroxyl compound, followed by removal of unreacted excess diisocyanate by distillation using, for example, a thin layer evaporator. The process of this patent is more cumbersome than might be desired, particularly in regard to the need for the isocyanate mixture and the need for removal of excess diisocyanate from the prepared monoisocyanate component.

In the production of heat-cured coatings, conventional methods for the heat-curing of monomeric diisocyanates have frequently been problematic in view of the toxicity concerns typically associated with employee exposure by the end user to volatile monomeric diisocyanates.

U.S. Pat. No. 5,144,031 discloses both heat-crosslinkable, one-component blocked-isocyanate compositions and two-component coating compositions which are said to harden at room temperature or at a slightly elevated temperature. The coating compositions of the '031 patent contain isocyanurate group-containing polyisocyanates produced by the steps of: (a) partially trimerizing the isocyanate groups of a cycloaliphatic diisocyanate in the presence of a trimerization catalyst and optionally in the presence of an inert solvent, (b) terminating the trimerization reaction at the desired degree of trimerization, (c) removing unreacted starting diisocyanate and any other volatile constituents, and (d) prior to step (c), adding 1 to 30 % by weight of a monohydric alcohol being an ester alcohol, based upon the weight of the diisocyanate. Unfortunately, this process is more complicated than might be desired, particularly with the requirement for the step (c) removal of unreacted starting diisocyanate after addition of the monohydric alcohol. In addition, the presence of the ester alcohol necessitates that a urethanization reaction takes place at the site of the ester alcohol on the prepolymer, in addition to the trimerization reaction that takes place with respect to the isocyanate moieties, rendering a more complex reaction sequence than might be desired.

Thus, a simpler process for coating a wide variety of substrates, not limited to the polyvinyl chloride substrate of the '658 patent and not employing the isocyanate mixture of the '350 patent, utilizing a heat-curable coating composition having a fast drying time would be highly desired by the one-component and two-component urethane coatings community. The present invention provides such a simplified process. The present invention also provides a solution to the toxicity problem that can be associated with monomeric diisocyanates by employing a low toxicity coating composition that is also low in VOC.

SUMMARY OF THE INVENTION

In one aspect, the present invention relates to a process for coating a substrate which comprises:

(a) contacting said substrate with a low volatility organic (so-called "low VOC") coating composition having a viscosity as measured by ZAHN cup 2 of less than about 200 seconds (preferably between about 10 seconds and about 150 seconds, most preferably between about 10 and about 100 seconds) and consisting essentially of at least one polyisocyanate, a solvent in an amount of between 0% and 45% (preferably between 0% and 35%, most preferably between 0% and about 30%) by weight based upon the amount of said polyisocyanate in said composition, and a trimerization catalyst, said composition being essentially free of any volatile mono- and di-isocyanates, to form a coating on said substrate, and (b) heating said coating to a curing temperature of between about 120° F. and about 350° F. (preferably between about 140° C. and about 300° C.) for a curing time of between about ten minutes and about six hours in order to cure said coating by trimerizing at least some isocyanate groups of said polyisocyanate to provide a heat-cured coating on said substrate.

In another aspect, the present invention relates to a low volatile-organics coating composition having a viscosity as measured by ZAHN cup 2 of less than about 200 seconds (preferably between about 10 seconds and about 150 seconds, most preferably between about 10 and about 100 seconds) and consisting essentially of at least one polyisocyanate, a solvent in an amount of between 0% and 45% (preferably between 0% and 35%, most preferably between 0% and about 30%) by weight based upon the amount of said polyisocyanate in said composition, and a trimerization catalyst, said composition being essentially free of any volatile mono-and di-isocyanates. The coating composition is heat curable upon exposure to a curing temperature of between about 120° F. and about 350° F. (preferably between about 140° C. and about 300° C.) for a curing time of between about ten minutes and about six hours.

In yet another aspect, the present invention relates to a process for coating a substrate which comprises:

(a) contacting said substrate with a low volatility organic coating composition having a viscosity as measured by ZAHN cup 2 of less than about 200 seconds (preferably between about 10 seconds and about 150 seconds, most preferably between about 10 and about 100 seconds) and consisting essentially of at least one polyisocyanate prepolymer which is the reaction product of a polyisocyanate with an active hydrogen-containing compound selected from the group consisting of monoahls, polyols, imines (such as ketimines and aldimines), oxazolidines, and combinations thereof, a solvent in an amount of between 0% and 45% (preferably between 0% and 35%, most preferably between 0% and about 30%) by weight based upon the amount of said polyisocyanate in said composition, and a trimerization catalyst, to form a coating on said substrate, and (b) heating said coating to a curing temperature of between 120° F. and 350° F. for a curing time of between about ten minutes and about six hours in order to cure said coating by trimerizing at least some isocyanate groups of said polyisocyanate to provide a heat-cured coating on said substrate.

Both of the above-described processes are suitably carried out using either one-component (so-called "1-K") or two-component (so-called "2-K") methodology.

In still another aspect, the present invention relates to a low volatile-organics coating composition having a viscosity as measured by ZAHN cup 2 of less than about 200 seconds (preferably between about 10 seconds and about 150 seconds, most preferably between about 10 and about 100 seconds) and consisting essentially of at least one polyisocyanate prepolymer which is the reaction product of a polyisocyanate with an active hydrogen-containing compound selected from the group consisting of monoahls, polyols, imines (such as ketimines and aldimines), oxazolidines, and combinations thereof, a solvent in an amount of between 0% and 45% (preferably between 0% and 35%, most preferably between 0% and about 30%) by weight based upon the amount of said polyisocyanate in said composition, and a trimerization catalyst, said composition being essentially free of any volatile mono- and di-isocyanates. The coating composition is heat curable upon exposure to a curing temperature of between 120° F. and 350° F. for a curing time of between about ten minutes and about six hours.

These and other aspects will become apparent upon reading the following detailed description of the invention.

DETAILED DESCRIPTION OF THE INVENTION

Without being bound to any particular theory, it has now been surprisingly found in accordance with the present invention that the in situ trimerization of low viscosity polyisocyanates during coating formation using a low VOC coating composition can be used to provide an excellent heat curable coating in the absence of acrylic polymers typically required heretofore to provide low VOC coating compositions.

The present invention provides so-called "one-component" and "two-component" coating compositions that have very low VOCs and are useful for coating a wide variety of substrates. The one-component coating composition consists essentially of a polyisocyanate or polyisocyanate prepolymer, a trimerization catalyst to facilitate heat curing of the composition, and an optional solvent. The two-component composition will typically comprise an A-side and a B-side, wherein the A-side consists essentially of a polyisocyanate and an optional solvent, and the B-side consists essentially of a trimerization catalyst and an optional isocyanate-reactive compound selected from the group consisting of monoahls, polyols, imines (such as ketimines and aldimines), oxazolidines, and combinations thereof. It is preferable to use the two-component composition for cases where pigment is incorporated in the coating since pigments normally contain water which is not easily removed and they can be incorporated in the B-side which is not sensitive to moisture.

The coating composition of the present invention is a low volatility organic (so-called "low VOC") coating composition having a viscosity as measured by ZAHN cup 2 of less than about 200 seconds and consisting essentially of at least one polyisocyanate, a solvent in an amount of between 0% and 45% by weight based upon the amount of said polyisocyanate in said composition, and a trimerization catalyst, said composition being essentially free of any volatile mono- and di-isocyanates. The composition is curable by trimerization of isocyanate groups of the polyisocyanate upon exposure to heat at a temperature of between 120° F. and 350° F. for a curing time of between about ten minutes and about six hours.

The coating composition may optionally also contain monoahl(s) and/or polyol(s), and one or more of these components may be desirable in order to avoid shrinkage problems during curing of the coating composition on the desired substrate.

Without wishing to be bound by any particular theory, the present inventors attribute the fast curing efficacy associated with the process of the present invention to heat in the presence of a trimerization catalyst which causes at least a portion of the monomeric polyisocyanate in the coating composition to trimerize and thus cross-link the coating to form a cured coating on the substrate.

Useful trimerization catalysts include the following: phosphines as described in U.S. Pat. No. 3,645,979; phosphorus acid triamides as described in U.S. Pat. No. 4,614,785; aminosilyl catalysts such as aminosilanes, diaminosilanes, silylureas, and silazanes as described in U.S. Pat. No. 4,412,073; alkali alcoholates and phenolates, alkali carboxylates, alkali hydroxides, and metallic salts of carboxylic acids as described in U.S. Pat. No. 2,978,449; tertiary amines as described in U.S. Pat. No. 3,745,133 and U.S. Pat. No. 3,981,829, aminimides as described in U.S. Pat. No. 4,067,830; quaternary ammonium carboxylates as described in U.S. Pat. No. 4,454,317 and U.S. Pat. No. 4,801,663; quaternary ammonium hydroxides as described in U.S. Pat. No. 4,324,879 and U.S. Pat. No. 5,124,427; Mannich bases, such as those based on nonylphenol, formaldehyde and dimethylamine as described in U.S. Pat. No. 3,996,223 and U.S. Pat. No. 4,115,373; and the like. The catalyst is suitably employed in an amount of between about 0.01% and about 5%, based upon the weight of the coating composition. Optionally, additional catalysts known to promote the reaction of isocyanates with other substrates e.g. alcohols may be utilized particularly in two-component systems. Such additional catalysts, for example dibutyltin dilaurate and stannous octoate, are suitably employed in an amount of between about 0.01% and 5%, based upon the weight of the coating composition.

As a measure of the viscosity of the coating composition employed in the present invention, the ZAHN cup 2 test is performed in accordance with ASTM D4212-88. Briefly, the ZAHN cup 2 test is performed by dipping a measured cup having a bottom hole into the test composition, followed by removal of the cup and measurement of the amount of time in seconds until a break occurs in the flow stream of test composition passing through the bottom hole. For purposes of comparison, the viscosities as measured by Zahn cup No. 2 can be converted to approximate kinematic viscosities, if desired, by a computation using the following equation:

$$\text{viscosity (in centistokes)} = 2.93(t) - 500/(t)$$

where t is the viscosity in seconds as measured by the Zahn cup No. 2 test regimen.

The polyisocyanates useful in the process of the present invention are those containing one or more of the following: biuret groups, isocyanurate groups (such as cyclotrimerized isocyanurate groups), uretidione groups, allophanate groups, urethane groups and combinations thereof. The polyisocyanate suitably has an average functionality of at least 2, preferably between 2.5 and 6, most preferably between 3 and 6. Suitable polyisocyanates include aliphatic polyisocyanates, aromatic polyisocyanates, and combinations thereof, but preferably at least some amount of an aliphatic polyisocyanate is employed in the process of the present invention. Polyisocyanates containing aliphatically and/or cycloaliphatically bound isocyanate groups are preferred for the production of light-stable coatings.

Blocking agents are suitably employed to block one or more of the isocyanate groups on the polyisocyanate if desired, followed by heat unblocking of the polyisocyanate at the desired temperature. Suitable blocking agents include those well-known in the art such as, for example, aromatic alcohols such as phenol, cresols, trimethyl phenols and tert-butyl phenols; tertiary alcohols such as tert-butanol, tert-amyl alcohol, and dimethyl phenyl carbinol; compounds which readily form enols such as ethyl acetoacetate, acetyl acetone and malonic acid diethyl ester; secondary aliphatic and aromatic amines such as dibutyl amine, N-methyl aniline, the N-methyl toluidines, N-phenyl toluidine and N-phenyl xylidine; imides such as succinimide; lactams such as e-caprolactam and d-valerolactam; oximes such as butanone oxime and cyclohexanone oxime; mercaptans, such as methyl mercaptan, ethyl mercaptan, butyl mercaptan, 2-mercapto-benzothiazole, alpha-naphthly mercaptan and dodecyl mercaptan; triazoles such as 1-H-1,2,4-triazole; and pyrazoles such as 3,5-dimethylpyrazole, 3-methylpyrazole, 4-nitro-3,5-dimethylpyrazole, and 4-bromo-3,5-dimethylpyrazole.

The polyisocyanates are prepared by the known modification of simple organic diisocyanates, typically resulting in the formation of biuret, uretidione, allophanate, urethane or isocyanurate groups, or the simultaneous formation of isocyanurate and uretidione groups. Any excess of unmodified monomeric starting isocyanate still present after the modification reaction is suitably removed in a known manner, such as distillation, to provide a polyisocyanate that is essentially free of volatile diisocyanate. The term "essentially free of volatile diisocyanate" as used herein is intended to designate that the polyisocyanate contains no greater than 0.7%, preferably no greater than 0.5%, most preferably no greater than 0.2%, by weight of volatile diisocyanate based upon the weight of the polyisocyanate.

Diisocyanates suitable for use in the preparation of the polyisocyanates include, for example, 2,4- and/or 2,6 diisocyanatotoluene, 4,4'-diisocyanato-dicyclohexylmethane, hexamethylene diisocyanate ("HDI"),and 1-isocyanato-3,3,5-trimethyl-5-isocyanatomethylcyclohexan e ("IPDI"), 1,4-butanediisocyanate, 1-methyl-2,4-diisocyanatocyclohexane, 1-methyl-2,6-diisocyanatocyclohexane, 4,4'-methylene-bis(cyclohexyl isocyanate), 2-methyl-1,5-diisocyanatopentane, 2-ethyl-1,4-diisocyanatobutane, 2,4,4-trimethylhexamethylene-1,6-diisocyanate, a,a'-diisocyanato-1,3-dimethylbenzene, a,a'-diisocyanato-1,3-dimethylcyclohexane, a,a'-diisocyanato-1,4-dimethylbenzene, a,a'-diisocyanato-1,4-dimethylcyclohexane, 1,3-diisocyanatocyclohexane, 1,4-diisocyanatocyclohexane wherein "a" denotes "alpha". The polyisocyanates may also be suitably prepared from mixtures of these, or other, diisocyanates, and mixtures of a polyisocyanate with a non-volatile isocyanate, such as octadecylisocyanate, are also suitable for use within the scope of the present invention. Preferably, aliphatic or cycloaliphatic diisocyanates are utilized as starting materials for preparing the polyisocyanates. HDI and IPDI are the most preferred starting materials for the preparation of polyisocyanates. Thus, most preferred polyisocyanates include tris-(isocyanatohexyl)-biuret, tris-(isocyanatohexyl)-isocyanurate, cyclodimerized HDI and mixtures thereof, as well as mixtures of these oligomeric polyisocyanates with their higher homologues. Trimerized HDI is available under the trademark of LUXATE, a product of Olin Corporation, as well as under the trademark Desmodur N-3300, a product of Miles Inc.

The active hydrogen-containing compound useful in the process of the present invention is suitably selected from the group consisting of monoahls, polyols, imines (such as ketimines and aldimines), oxazolidines, and combinations thereof, preferably having a weight average molecular weight of between about 50 and about 10,000, more preferably between about 100 and about 5,000, most preferably about 200 and about 2,000.

The term "monoahl" is intended to designate compounds having only one active hydrogen group. An active hydrogen group is a group which has a hydrogen atom which, because of its position in the molecule, displays activity according to the Zerewitnoff test described by Woller in the Journal of American Chemical Society, Vol. 49, page 3181 (1927). Illustrative of such active hydrogen groups are —OH, —NH—, —COOH, —SH and —CONH—. Typical monoahls suitable for this invention include monoalcohols, monoamines, thiols, carboxylic acids, amides and imines.

Suitable monoalcohols are the aliphatic or cycloaliphatic alcohols, optionally containing ester or ether linkages. Preferred monoahls are monohydric polyethers and monohydric polyesters. Monohydric polyethers are prepared by the polymerization of alkylene oxides with alcohols. Alcohols which may be employed in the polymerization include C1–C30 (cyclo)aliphatic straight- or branched-chain alcohols, such as methanol, ethanol, propanol, isopropanol, butanol, hexanol, cyclohexanol, and the like, and mixtures thereof. Illustrative alkylene oxides used in the polymerization include ethylene oxide, propylene oxide, butylene oxide, and the like. Monohydric polyesters are most readily prepared by the polymerization of lactones such as butyrolactone, valerolactone, caprolactone, and the like with alcohols. Suitable alcohols include the alcohols described above for polymerization with alkylene oxides.

Suitable amines are aliphatic or cycloaliphatic, primary or secondary amines. Preferred amines are poly-(alkyleneoxy)alkylamines.

Polyols suitable for the present invention include polyether polyols and polyester polyols. The preferred polyols useful in the present invention have a functionality of about 2 in order to prevent the formation of very high molecular weight polyurethane prepolymers which result in coating viscosities higher than desired for ready application. The polyether polyols are prepared by polymerization of alkylene oxides with water, polyhydric alcohols with two to eight hydroxyl groups, or amines. Polyester polyols include the condensation products of polycarboxylic acids with polyhydric alcohols.

In preparing the polyisocyanate prepolymers useful in the present invention, and in utilizing the polyisocyanates in both the one-component and two-component systems of the present invention, the ratio of NCO equivalents in the polyisocyanate to the OH equivalents in the active hydrogen-containing compound can vary over a wide range of between about 2:1 and about 10,000:1, preferably between about 2.5:1 and about 2,000:1, most preferably between about 3:1 and about 2,000:1.

The coating compositions employed in the process of the present invention suitably contain small quantities of isocyanate-inert solvents in amounts of between 0% and 45% by weight, based upon the weight of the coating composition. It is preferred to minimize the amount of solvent utilized in the coating compositions of the present invention in order to minimize the VOC of the coating composition itself. However, some amount of solvent may be required in order to provide a desired low viscosity for the coating composition of less than about 200 seconds as measured by Zahn cup #2. Suitable solvents include toluene, xylene, butyl acetate, methyl ethyl ketone, methyl isobutyl ketone, methylamyl ketone, ethylethoxy propionate, ethoxyethylacetate, an aromatic hydrocarbon mixture having a boiling point of 152°–174° C., combinations thereof, and the like. Other optional additives are suitably employed, if desired, such as, for example, uv stabilizers; leveling agents; flow-aids; pigments, such as titanium dioxide; plasticizers; and/or other resins.

The coating compositions made in accordance with the process of the present invention are suitable for use in the production of clear or pigmented coatings, and may be applied to a desired substrate by conventional methods, such as spread coating, roller application or spraying. Because of the low viscosity of the compositions of the present invention, they are especially suitable for application by conventional spray techniques. The coating thickness on the substrate can vary over a wide range, although a dry film coating thickness of between about 0.01 and 0.5 millimeters is preferred.

Substrates for the coating useful in the present invention are suitably selected from a wide range of materials such as other plastics, such as polyethylene or polystyrene, wood and paper substrates, and metal substrates, such as sheet steel or aluminum.

The coating compositions of the present invention are stable in storage when heat is excluded and they harden under the influence of heat to form coatings. As stated above, hardening or curing of the coatings on the substrate in accordance with the invention is preferably carried out upon exposure to heat at a temperature of between 120° F. and 350° F. for a curing time of between about ten minutes and about six hours.

The coatings of the present invention are suitable for use in the production of automotive clear coatings or undercoats, floor covering coatings, wall coatings, transportation coatings, maintenance coatings, and the like, or any other application where a low VOC coating composition is desired for use on a substrate. The following examples are intended to illustrate, but in no way limit the scope of, the present invention.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLES

The following products were utilized in the examples given hereinbelow:

Monoahl A is a mixture of ethoxylated/propoxylated C6–C10 alcohols having an average molecular weight of about 530.

Polyisocyanate A is trimerized hexamethylene diisocyanate.

Polyisocyanate B is a reaction product of 80 parts of Polyisocyanate A with 20 parts of Monoahl A and 1 part of dibutyltin dilaurate (5% in toluene) heated at 80° C. for 3 hours.

Flow-aid is an acrylic flow and leveling agent sold as a 60% solids solution in xylene under the trademark Coroc A-620-A2, a product of Freeman Polymers.

Example 1-21

A 100-ml bottle was charged with ethylethoxypropionate (EEP), a polyisocyanate, a monoahl, a catalyst, and a flow-aid. The bottle was rolled for 5 minutes to provide a homogeneous coating composition.

TABLE 1

POLYISOCYANATE MONOAHL A

TABLE 1-continued

| EXAMPLE | POLYISOCYANATE TYPE | AMOUNT (g) | AMOUNT (g) | CATALYST TYPE |
|---|---|---|---|---|
| 1 | A | 17.83 | 4.46 | calcium napthanate (4% in mineral spirits) |
| 2 | A | 18.1 | 4.52 | potassium pivilate (10% in toluene) |
| 3 | A | 17.83 | 4.46 | tributylphosphine oxide |
| 4 | A | 18.1 | 4.52 | triphenylphosphine oxide |
| 5 | A | 18.1 | 4.52 | trioctylphosphine oxide |
| 6 | A | 18.1 | 4.52 | trioctylphosphine |
| 7 | A | 18.1 | 4.32 | triphenylphosphine |
| 8 | A | 17.57 | 4.39 | 1,1,1,3,3,3-hexamethyldisilazane |
| 9 | A | 17.83 | 4.46 | N,N'-dimethylaminoethyl,N-methyl ethanolamine |
| 10 | A | 18.1 | 4.52 | N,N'-dimethylaminopropyl,N-methyl ethanolamine |
| 11 | B | 22.29 | 0 | calcium napthanate (4% in mineral spirits) |
| 12 | B | 22.62 | 0 | potassium pivilate (10% in toluene) |
| 13 | B | 22.71 | 0 | potassium trifluoroacetate (20% in triethylene glycol monomethyl ether) |
| 14 | B | 22.71 | 0 | potassium trifluoroacetate (20% in triethylene glycol monomethyl ether) |
| 15 | B | 22.62 | 0 | trioctylphosphine oxide |
| 16 | B | 22.29 | 0 | tributylphosphine oxide |
| 17 | B | 21.96 | 0 | 1,1,1,3,3,3-hexamethyldisilazane |
| 18 | B | 22.62 | 0 | N,N'-diemthylaminoethyl,N-methyl ethanolamine |
| 19 | B | 22.62 | 0 | N,N'-dimethylaminopropyl,N-methyl ethanolamine |
| 20 | B | 22.49 | 0 | reaction product of 1,8-diazabicyclo-5,4,0-undecene-7 and 2-ethylhexanoic acid |
| 21 | B | 22.49 | 0 | reaction product of 1,8-diazabicyclo-5,4,0-undecene-7 and phenol |

| EXAMPLE | CATALYST AMOUNT (g) | DIBUTYLTIN DILAURATE AMOUNT (g) | EEP AMOUNT (g) | FLOW-AID AMOUNT (g) | SOLVENT WEIGHT % |
|---|---|---|---|---|---|
| 1 | 0.67 | 0.27 | 6.69 | 0.09 | 22.3% |
| 2 | 0.23 | 0.27 | 6.79 | 0.09 | 22.6% |
| 3 | 0.67 | 0.27 | 6.69 | 0.09 | 22.3% |
| 4 | 0.23 | 0.27 | 6.79 | 0.09 | 22.6% |
| 5 | 0.23 | 0.27 | 6.79 | 0.09 | 22.6% |
| 6 | 0.23 | 0.27 | 6.79 | 0.09 | 22.6% |
| 7 | 0.23 | 0.27 | 6.79 | 0.09 | 22.6% |
| 8 | 1.1 | 0.26 | 6.59 | 0.09 | 22.0% |
| 9 | 0.67 | 0.27 | 6.69 | 0.09 | 22.3% |
| 10 | 0.23 | 0.27 | 6.79 | 0.09 | 22.6% |
| 11 | 0.67 | 0 | 6.69 | 0.09 | 22.5% |
| 12 | 0.23 | 0 | 6.79 | 0.09 | 22.8% |
| 13 | 0.11 | 0 | 6.81 | 0.09 | 22.9% |
| 14 | 0.11 | 0 | 6.81 | 0.09 | 22.9% |
| 15 | 0.23 | 0 | 6.79 | 0.09 | 22.8% |
| 16 | 0.67 | 0 | 6.69 | 0.09 | 22.5% |
| 17 | 1.1 | 0 | 6.59 | 0.09 | 22.2% |
| 18 | 0.23 | 0 | 6.79 | 0.09 | 22.8% |
| 19 | 0.23 | 0 | 6.79 | 0.09 | 22.8% |
| 20 | 0.67 | 0 | 6.75 | 0.09 | 22.5% |
| 21 | 0.67 | 0 | 6.75 | 0.09 | 22.5% |

Examples 22–42

The coating compositions prepared in Examples 1–21 were applied to cold-rolled steel panels by drawing down a film of about 2 mils thickness. The coated test panels were cured in an oven held at 135° C. The coated test panels were stored at ambient temperature and humidity conditions for two weeks before testing for appearance, mechanical properties, and chemical resistance. Pencil hardness was determined according to ASTM D3363-92a. The conical mandrel bend tests were performed using a one-eighth inch tester from BYK-Gardner, Inc. according to ASTM D522-92. Direct and reverse impact values were determined according to ASTM D2794-92 using a variable height impact tester from BYK-Gardner, Inc. Cross-hatch adhesion was determined using a cross-hatch cutter from BYK-Gardner according to ASTM D3359-92a. Chemical resistance was determined according to ASTM D1308-87. Although most of the coatings properties show in the table are acceptable for a wide variety of applications, those showing a poor result in one or two properties would be suitably utilized in applications not requiring those properties.

TABLE 2

| EXAMPLE | COATING COMPOSITION | SOLVENT EVAPORATION (min) | GEL TIME (min) | SURFACE DRY (min) | PENCIL HARDNESS | MANDREL BEND | DIRECT IMPACT (in/lb) |
|---|---|---|---|---|---|---|---|
| 22 | Example 1 | 5 | 25 | 50 | 3 | PASS | 140 |
| 23 | Example 2 | 5 | 15 | 25 | 2 | NT* | NT* |
| 24 | Example 3 | 5 | 10 | 30 | 2 | PASS | 160 |
| 25 | Example 4 | 5 | 20 | 50 | 3 | NT* | NT* |
| 26 | Example 5 | 5 | 20 | 55 | 3 | PASS | 160 |
| 27 | Example 6 | 5 | NT* | NT* | 3 | NT* | 160 |
| 28 | Example 7 | 5 | NT* | NT* | NT* | NT* | NT* |

TABLE 2-continued

| | | | | | | | |
|---|---|---|---|---|---|---|---|
| 29 | Example 8 | 5 | 10 | 25 | 3 | PASS | 160 |
| 30 | Example 9 | 5 | 20 | 45 | 3 | PASS | 160 |
| 31 | Example 10 | 5 | 15 | 40 | 3 | NT* | NT* |
| 32 | Example 11 | 5 | 25 | 50 | 3 | PASS | 140 |
| 33 | Example 12 | 5 | 15 | 25 | 2 | NT* | NT* |
| 34 | Example 13 | 5 | 20 | 50 | 3 | PASS | 160 |
| 35 | Example 14 | 5 | 20 | 50 | 3 | PASS | 160 |
| 36 | Example 13 | 5 | 20 | 55 | 3 | PASS | 160 |
| 37 | Example 16 | 5 | 10 | 30 | 2 | PASS | 160 |
| 38 | Example 17 | 5 | 10 | 25 | 3 | PASS | 160 |
| 39 | Example 18 | 5 | 15 | 45 | 3 | PASS | 160 |
| 40 | Example 19 | 5 | 15 | 40 | 3 | NT* | NT* |
| 41 | Example 20 | 5 | 85 | 100 | 3 | PASS | 160 |
| 42 | Example 21 | 5 | 45 | 100 | 3 | PASS | 160 |

| EXAMPLE | REVERSE IMPACT (in/lb) | CROSSHATCH ADHESION | CHEMICAL RESISTANCE | | | MEK RUB | XYLENE RUB |
| | | | NaOH (10%) | HCl (10%) | CH3COOH (10%) | | |
|---|---|---|---|---|---|---|---|
| 22 | 140 | PASS | PASS | PASS | PASS | PASS | PASS |
| 23 | NT* | NT* | NT* | NT* | NT* | NT* | NT* |
| 24 | 160 | PASS | PASS | PASS | PASS | PASS | PASS |
| 25 | NT* | NT* | NT* | NT* | NT* | NT* | NT* |
| 26 | 160 | PASS | PASS | PASS | PASS | PASS | PASS |
| 27 | 160 | PASS | PASS | PASS | PASS | PASS | PASS |
| 28 | NT* | NT* | NT* | NT* | NT* | NT* | NT* |
| 29 | 160 | PASS | PASS | PASS | PASS | PASS | PASS |
| 30 | 160 | PASS | PASS | PASS | PASS | PASS | PASS |
| 31 | NT* | NT* | NT* | NT* | NT* | NT* | NT* |
| 32 | 140 | PASS | PASS | PASS | PASS | PASS | PASS |
| 33 | NT* | NT* | NT* | NT* | NT* | NT* | NT* |
| 34 | 160 | PASS | PASS | PASS | PASS | PASS | PASS |
| 35 | 160 | PASS | PASS | PASS | PASS | PASS | PASS |
| 36 | 160 | PASS | PASS | PASS | PASS | PASS | PASS |
| 37 | 160 | PASS | PASS | PASS | PASS | PASS | PASS |
| 38 | 160 | PASS | PASS | PASS | PASS | PASS | PASS |
| 39 | 160 | PASS | PASS | PASS | PASS | PASS | PASS |
| 40 | NT* | NT* | NT* | NT* | NT* | NT* | NT* |
| 41 | 160 | PASS | PASS | PASS | PASS | PASS | PASS |
| 42 | 160 | PASS | PASS | PASS | PASS | PASS | PASS |

*"NT" denotes "not tested".

What is claimed is:

1. A process for coating a substrate which comprises:
(a) contacting said substrate with a low volatile organic compounds-containing coating composition having a viscosity as measured by ZAHN cup 2 of less than about 200 seconds and consisting essentially of at least one polyisocyanate having an average functionality of between 2.5 and 6 and containing at least one moiety selected from the group consisting of biuret, isocyanurate, uretidione, allophanate, urethane, and combinations thereof, a solvent in an amount of between 0% and 45% by weight based upon the amount of said polyisocyanate in said composition, and a trimerization catalyst, said composition being essentially free of any volatile mono- and di-isocyanates, to form a coating on said substrate, and
(b) heating said coating to a curing temperature of between 120° F. and about 350° F. for a curing time of between about ten minutes and about six hours in order to cure said coating by trimerizing at least some isocyanate groups of said polyisocyanate to provide a heat-cured coating on said substrate.

2. The process of claim 1 wherein said coating composition is solvent-free.

3. The process of claim 1 wherein said solvent is selected from the group consisting of toluene, xylene, butyl acetate, methyl ethyl ketone, methyl isobutyl ketone, methylamyl ketone, ethoxyethylacetate, ethylethoxy propionate, an aromatic hydrocarbon mixture having a boiling point of 152°-174° C. and combinations thereof.

4. The process of claim 1 wherein said polyisocyanate is selected from the group consisting of aliphatic or cycloaliphatic polyisocyanates, and combinations thereof.

5. The process of claim 4 wherein said polyisocyanate is an aliphatic polyisocyanate prepared from hexamethylene diisocyanate.

6. The process of claim 1 wherein said polyisocyanate is selected from the group consisting of tris-(isocyanatohexyl)-biuret, tris-(isocyanatohexyl)isocyanurate, cyclodimerized hexamethylene diisocyanate and combinations thereof.

* * * * *